United States Patent [19]

Feissel

[11] 4,395,754

[45] Jul. 26, 1983

[54] DATA PROCESSING SYSTEM HAVING VIRTUAL MEMORY ADDRESSING

[75] Inventor: Wolfgang Feissel, Munich, Fed. Rep. of Germany

[73] Assignee: Siemens Aktiengesellschaft, Berlin & Munich, Fed. Rep. of Germany

[21] Appl. No.: 180,337

[22] Filed: Aug. 22, 1980

[30] Foreign Application Priority Data

Sep. 28, 1979 [DE] Fed. Rep. of Germany ....... 2939411

[51] Int. Cl.³ .............................................. G06F 7/04
[52] U.S. Cl. ................................... 364/200; 364/900
[58] Field of Search ... 364/200 MS File, 900 MS File

[56] References Cited

U.S. PATENT DOCUMENTS 4,057,848 11/1977 Hayashi ............................... 364/200

FOREIGN PATENT DOCUMENTS 1553048 9/1979 United Kingdom ................ 364/200

*Primary Examiner*—Gareth D. Shaw
*Assistant Examiner*—Terence Flyntz
*Attorney, Agent, or Firm*—Hill, Van Santen, Steadman, Chiara & Simpson

[57] ABSTRACT

A data processing system has virtual memory addressing and includes a buffer between the working memory and the central processor. The buffer includes a data buffer divided into a plurality of banks of identical size and a plurality of tag/flag memories respectively assigned to the data banks for storing the page address. The data buffer bank and the tag/flag memories are additionally addressed, beyond the page class address, with as many further, directly connected address bits of a virtual page address as are required for the binary addressing of the individual data buffer banks. The virtual partial addressing of the buffer provides a simple addressing for the case in which memory modules of the buffer banks have a capacity beyond the page size.

2 Claims, 1 Drawing Figure

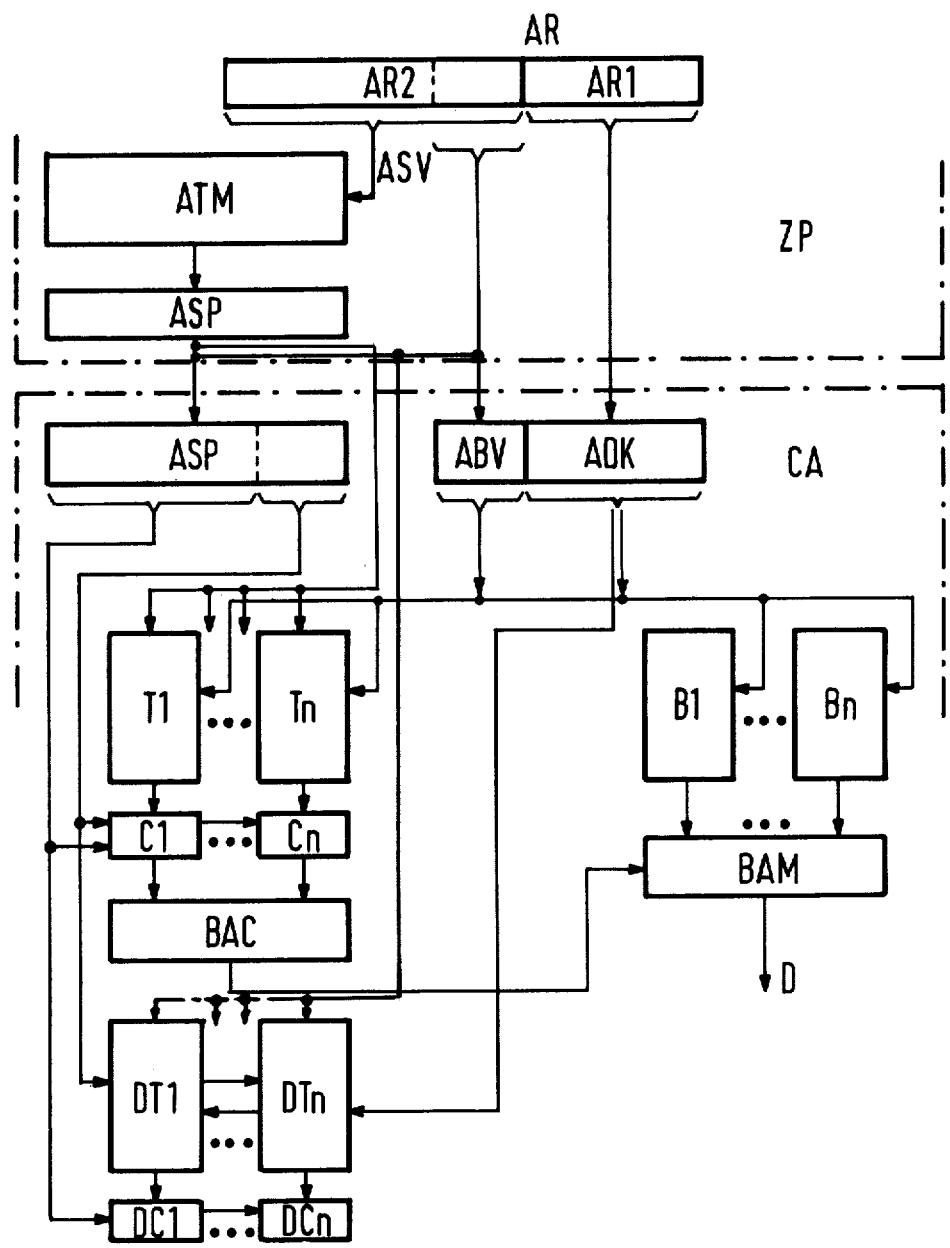

DATA PROCESSING SYSTEM HAVING VIRTUAL MEMORY ADDRESSING

BACKGROUND OF THE INVENTION

1. Field of the Invention

The present invention relates to a data processing system having virtual memory addressing, and more particularly to such a system in which a central processor contains an address register whose low-order portion accepts a real class address and whose higher-order portion accepts a virtual page address, in which an address translation memory translates virtual page addresses into real page addresses, and in which a buffer memory is arranged between the central processor and a working memory, which contains a first address register for the real page address and a second address register for the real class address and which further comprises a data buffer subdivided into a plurality of banks of identical size and a plurality of tag/flag memories respectively assigned to the banks for storing the page address, a respective comparison circuit being provided at the outputs of the tag/flag memories for comparing the translated page address to the page address existing under certain conditions in the tag/flag memory, and in which, given equality of the two addresses, a control signal is emitted for the appertaining data buffer.

2. Description of the Prior Art

Larger data processing systems often work with virtual memory addressing. This results in the fact that, given access to the working memory, every virtual address must previously be translated in a real, physical address. In order to keep the expense as low as possible, this translation occurs in a known manner in that the virtual memory and the physical memory are subdivided into pages of, for example, 2 k byte size and a virtual page address is assigned to each physical page address by way of translation tables which, for example, can be stored in the working memory. In order to keep the number of read accesses to the address translation tables as low as possible, as is known from the British Pat. No. 1,153,048 and the German published application No. 26 05 617, a rapid, partially associative address translation memory is provided in the central unit in which a portion of the translation tables is temporarily duplicated. Because of its smallness, such an address translation memory is preferably similarly constructed and organized like a buffer memory or, respectively, cache often provided in larger systems between the central processor and the working memory, so that memory accesses in such systems can be executed in a particularly time-saving manner.

Buffer memories and working memories are generally organized according to the congruence class principle, i.e. are subdivided into pages, whereby a distinction according to classes is again made within each page. For the manner of operation of the buffer memory, subdivided into a plurality of banks of page size, the determination is important that although data words may be entered from the working memory into any bank of the buffer memory, they may only be entered within each bank in that class from which the data word was taken from the working memory. In the search operation for a specific entry in the buffer memory, this offers the advantage that both the banks of the data buffer and the tag/flag memories assigned to the banks in which the page addresses of the individual entries are contained can be directly and immediately selected with the class address, because the class address portion of a user address remains unchanged in the address translation. If, however, as already mentioned, the address translation memory is built up and organized analogous to the buffer memory, then this can be driven with the virtual page address at the same time as the tag/flag memories and the data buffer banks respectively driven with the real class address, so that all three aggregates simultaneously offer the selected contents at their outputs after termination of the access time.

Finally, the translated, real address is compared in a comparator circuit to the content of the tag/flag memory, and given address equality, the bank selection multiplexer post-connected to the data buffer banks is appropriately set. The read access is thus terminated, so that a new read access can be immediately initiated.

This simultaneous access to the tag/flag memory and to the data buffer banks is always possible when the capacity of the individual data buffer banks coincides with the page size provided for the address translation. The continuing development in the area of memory technology, however, now leads to the fact that the capacity of the memory modules from which the data buffer banks are constructed is constantly increasing. Among other things, this also makes a more complex format of the memory possible, which in turn benefits the access time. As is known, the capacity of a data buffer bank is determined from the product of the width of access of the central processor during "read" and the bit capacity of the selected memory modules, so that, given a width access of 8 byte and a module capacity of 1024 bits, for example, a capacity of 8 k byte occurs. In contrast thereto, the page size fixed in the operating systems at present amounts to only 2 k byte and will remain fixed in value in the forseeable future.

The difficulty therefore exists that the advantageous direct addressing with the respectively appertaining class address can only be retained when the page division adapted to the new technical conditions and if it were to be likewise increased to 8 k byte in accordance with the example selected. The change of the operating systems required in this regard, however, cannot be expected in the immediate future.

SUMMARY OF THE INVENTION

The object of the invention, therefore, is to provide a manner, in which as simple as possible, an addressing without loss of speed can be carried out, given access to the buffer memory, even given memory modules whose capacity is well beyond the fixed page size.

In a data processing system of the type generally set forth above, this object is achieved by providing that the second address register of the buffer memory have additional, higher-order locations into which as many address bits of the virtual page address directly connected to the real page class address are transferred from the address register of the central processor as are required beyond the real class address for addressing each individual data buffer bank and the appertaining tag/flag memory.

BRIEF DESCRIPTION OF THE DRAWINGS

Other objects, features and advantages of the invention, its organization, construction and operation will be best understood from the following detailed description, taken in conjunction with the accompanying drawing, on which there is a single figure which is a logic diagram illustration of a computer system constructed in accordance with the present invention.

DESCRIPTION OF THE PREFERRED EMBODIMENTS

On the drawing, a portion of the central processor ZP is illustrated as being connected to a buffer memory CA. The buffer memory CA, which is generally also designated as a cache, is arranged between the central processors ZP and a working memory (not illustrated). The central processor ZP contains an address register AR in which the addresses of data required for a processing operation are intermediately stored.

The data processing system operates with virtual addressing. A virtual memory having a memory capacity which extends beyond the size of the real working memory is made available to the programs and data. If the space in the real working memory does not suffice for the programs and data, then portions are transferred to an external memory and are again transferred into the working memory when the same are required for processing. These interchangeable portions of data are called pages, having, for example, an extent of 2 k byte. Each page is, in turn, subdivided into classes. This page and class format is also provided in the cache, whereby it is essential for this manner of operation that data from the working memory are only entered into the same class in the data buffer from which they derive in the working memory.

The complete address with which access is had to the buffer memory CA is stored in an address register AR. The partial address AR2 contains the virtual page address, whereas the class address which the addressing undertakes within a page is stored in the partial register AR1. In order to execute an access in the buffer memory, the address must be offered to the buffer memory as a physical address. Therefore, the central processor contains a partially associative address translation memory ATM in which physical page addresses ASP assigned to the virtual page addresses ASV are stored. The buffer memory CA operates according to the "set associative" principle and consists in detail of a buffer memory subdivided into n banks B1-Bn of identical size and tag/flag memories T1-Tn, likewise n in number, assigned to the individual data buffer banks in which tag/flag memories the page addresses of all buffer memory entries are stored.

The buffer memory illustrated on the drawing now differs insofar as, for addressing the tag/flag memories T1-Tn and the data buffer banks B1-Bn, it is not only the class address ADK, i.e. the low-order address bits stored in the partial address register AR1 which are employed but, rather, as many further, but virtual address bits ABV as are required for the complete addressing of a buffer bank. After termination of the access time, the entries respectively under consideration are available at the outputs of tag/flag memories T1-Tn and the data buffer banks B1-Bn. At the same time, as in a normal cache, the virtual page address ASV is translated via an access to the address translation memory ATM into a physical page address ASP. By comparing the translated page address ASP to the real page address entries from the tag/flag memories T1-Tn, in a plurality of comparators C1-Cn, it can be determined whether the desired entry exists in the cache, since an entry in the cache, as in "read", is also executed with the additionally required, virtual address bits ABV.

Given equality of both addresses, a selection code is provided to a bank selection multiplexer BAM.

Accordingly, upon reading cache entries, there are no problems with the virtual subaddressing as long as the entry is undertaken in the same manner of addressing. Problems occur, however, when various virtual addresses are translated into the same real address. In particular, a read access can lead to the result that an entry does not exist, whereas it nonetheless exists under a different virtual address. This state of affairs does not have a negative influence on the read function, but difficulties do occur in writing, since all entries belonging to the same real address must be acquired in writing. This problem is solved by way of the common, real address in such a manner that the real page address is not stored only once in the tag/flag memory, but, rather, is additionally stored a second time in a so-called duplicate tag/flag memory DT1-DTn which, in contrast to the original tag/flag memories T1-Tn, is addressed real in all address portions. The virtual bank address portion of the original address is stored in the duplicate tag/flag memory in addition to the real page addresses.

A plurality n of duplicate comparators DC1-DCn are provided at the output of the duplicate tag/flag memories DT1-DTn in which an address comparison occurs between the address stored in the duplicate tag/flag memory and the real page address reduced by the auxiliary address bit page address portion. The individual modules of the circuit, for example, memories, registers, encoders, multiplexers, etc, are standard modules in data technology and, as such, are well known in the art.

In the following, the sequences of a read and write operation are described in greater detail. For the case in which, given a read operation with the assistance of the original comparators C1-Cn, it is determined that the desired entry is not contained in the cache, a read access to the working memory must be initiated. During the working memory accesses, it is then determined into which bank the read data are to be entered. At the same time, the duplicate tag/flag memory is addressed with the real address in order to determine whether the desired read data are not indeed stored under a different virtual bank address. If this should be the case, the buffer bank selection undertaken by the replacement algorithm is ignored and, instead of the same, that bank is selected in which the entry can be found, even if under a different virtual address. Subsequently, the entry discovered in the original tag/flag memory is defined as invalid. Moreover, the class with the new virtual bank address bits is selected in the same bank and a valid entry existing here is defined as invalid in the duplicate tag/flag memory. Subsequently, the read data coming from the working memory are deposited precisely at that location. At the same time, the read page address is stored in the original tag/flag memory T1-Tn in the appertaining cell and the presently valid, virtual bank address portion is additionally stored in the duplicate tag/flag memory DT1-DTn. By this procedure, it is guaranteed, despite virtual set addressing, each address and data entry only occurs once.

Therefore, precautionary measures are also undertaken with respect to the problems in write operations. If, in a write operation, the data to be overwritten are discovered by way of the original tag/flag memory access, then the same are overwritten in a known manner. Because of the procedure in loading, they cannot reside at a second location.

If the data to be overwritten, are not discovered, however, by way of the normal, virtual partial addressing, then they can nonetheless exist in the buffer. One must then address with the real page address bits of the duplicate tag/flag memories and monitor with the duplicate comparators DC1-DCn as to whether the appertaining entry does not exist under another virtual bank address. If this is not the case, then the write procedure is terminated. If an entry exists, then it can either be correctly overwritten or, if this is too complicated, it can be erased.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a data processing system of the type having virtual addressing and in which a central processor includes a first address register comprising a lower-order portion for receiving real class addresses, and a higher-order portion for receiving virtual page addresses, and an address translation memory means for converting virtual page addresses into real page addresses, and in which a buffer memory is connected between the central processor and a working memory of the system and includes a second address register for receiving real page addresses, a third address register for receiving real class addresses, a data buffer comprising a plurality of equal size data banks connected to and accessed by the third address register, a plurality of tag/flag memories respectively assigned to the data banks and connected to the third address register and connected to the address translation means for storing real page addresses, and comparison means connected to compare the translated page addresses with the page addresses in the tag/flag memories and emit a data bank selection signal to a data bank multiplexer in response to equality of the addresses, the improvement therein comprising:

predetermined higher-order locations in the higher-order portion of the first address register for receiving and storing additional virtual address bits of virtual addresses, which additional virtual address bits are directly connected with the real page class addresses and are equal in number to the bits required for addressing each data bank and its associated tag/flag memory and which are provided in addition to a real class address;

a section of said third address register connected to said first address register to receive the bits stored in said predetermined higher-order locations and transfer said additional virtual address bits to said data banks; and duplicate tag/flag memories respectively assigned to the tag/flag memories and connected to said third address register and to said address translation memory means for addressing with both the real class addresses and the additional real page addresses obtained by translation of the additional virtual address bits.

2. The improved data processing system of claim 1, and further comprising:

a plurality of comparison circuits each connected to a respective duplicate tag/flag memory and connected to said address translation memory means for comparing the duplicate tag/flag memory output with the translated address not including the additional virtual address bits.

* * * * *